Nov. 24, 1970  W. P. GERGEN ET AL  3,541,842
CONTINUOUS HARDNESS TESTER
Filed Aug. 15, 1968  2 Sheets-Sheet 1

INVENTORS:
W. P. GERGEN
J. C. CLARK
J. W. MARTIN

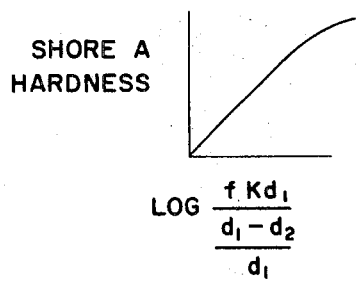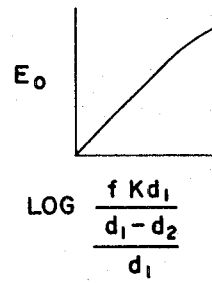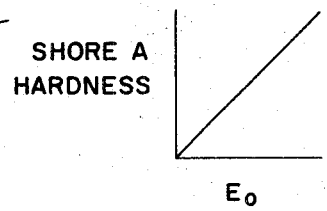
FIG. 3A   FIG. 3B   FIG. 3C
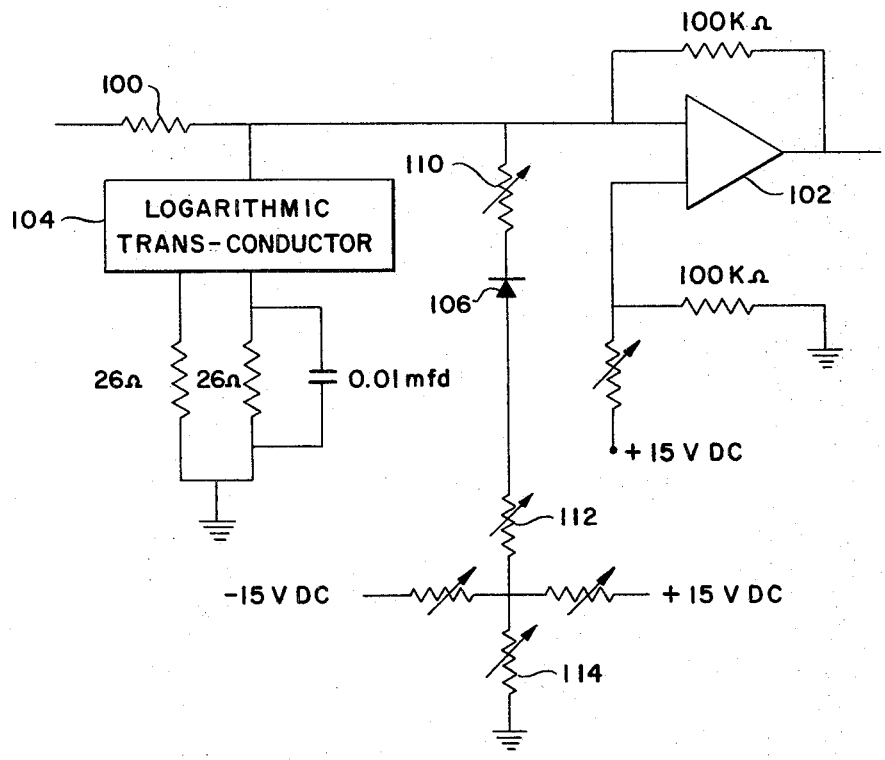
FIG. 4
INVENTORS:
W. P. GERGEN
J. C. CLARK
J. W. MARTIN

[Patent No.] 3,541,842
[Patented] Nov. 24, 1970

3,541,842
CONTINUOUS HARDNESS TESTER
William P. Gergen, Garden Grove, John C. Clark, Lakewood, and Jon W. Martin, Los Alamitos, Calif., assignors to Shell Oil Company, New York, N.Y., a corporation of New York
Filed Aug. 15, 1968, Ser. No. 752,950
Int. Cl. G01n 3/42
U.S. Cl. 73—81     3 Claims

ABSTRACT OF THE DISCLOSURE

A system and method for automatically measuring and recording the hardness of a polymer material and using the results thereof to control a process. A sample material is compressed between two sets of rollers by known forces. The deformations are measured and related through a computer to the hardness of the samples.

BACKGROUND OF THE INVENTION

This invention relates to the testing of the hardness of materials and more particularly it relates to the continuous testing of elastomer hardness such that the elastomer process may be controlled by the output therefrom.

Hardness is a property of materials for which many tests have been devised. For relatively soft materials such as polymers, the Shore A hardness test and scale is well known. It is known that the hardness of polymers varies predictably with compositional changes, particularly changes in resin concentrations. Thus, hardness could theoretically be used as a control parameter in polymer processes. That is, variations in the flow rate of certain input materials due to changes in the environment or in the input material itself could be detected with the proper hardness tester. The present instruments, however, are unable to measure hardness either accurately enough or quickly enough to be of value in controlling continuous flow apparatus being used in modern polymer processes. It is therefore a primary object of this invention to provide a method for controlling a polymer process utilizing hardness as a control parameter.

Another object is to provide an instrument for accurately and quickly determining the Shore A hardness of a polymer.

SUMMARY OF THE INVENTION

This objective may be achieved by first forming a film or strand of the material to be controlled. The thickness dimension of the film is measured and an output signal proportional thereto is generated. The film is then compressed by a known force and a second output signal proportional to the change in thickness dimension is generated. The first and second output signals can then be electronically manipulated to produce an output signal proportional to Shore A hardness. The hardness output signal may then be used to control the feedstocks, temperature, or the like to maintain a constant hardness on the material to be controlled.

BRIEF DESCRIPTION OF THE DRAWING

FIG. 3 shows the relationship between Shore A hardness and the output of the electronic section of the invention.

FIG. 4 is a schematic diagram of a circuit used for shaping the electrical signal to the empirical hardness function.

Figure 1:
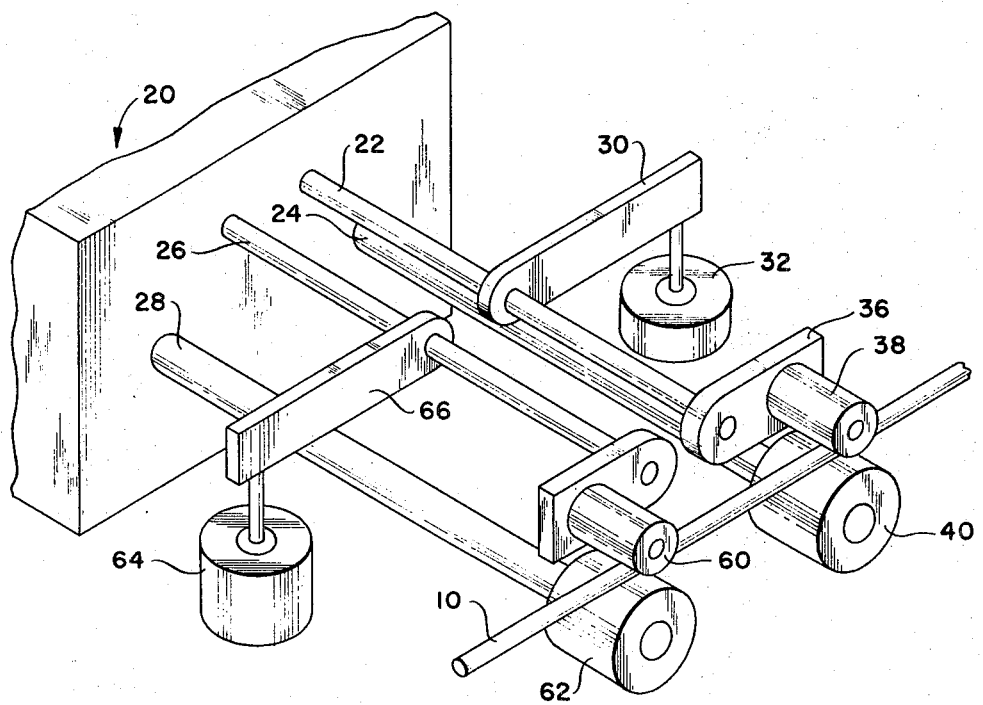
FIG. 1 is an isometric of the mechanical deformation portion of the invention.

Any hardness scale could be used in the connection so long as it could be correlated with the control parameters. The Shore A hardness being well known is used to illustrate the invention.

To understand the present invention and how it works, it is instructive to start with the Shore hardness definition and follow through the reasoning of the present invention. From classical elasticity theory it can be shown that a relationship exists between penetration hardness and Young's modulus. In particular Shore hardness is derived as follows:

$$\text{Shore A hardness} = k_1 - d_p \quad (1)$$

and:

$$d_p = k_2 \frac{f}{rE} \quad (2)$$

where:

$k_1$ = the hardness at zero penetration
$f$ = force
$k_2$ = a constant for the instrument
$E$ = Young's modulus
$r$ = the indentor radius
$d_p$ = the penetration depth of a truncated cone indentor Equation 2 was recognized as a special case of a general mechanical deformation system. Young's modulus at finite deformations can then be determined by systems using different modes of deformation. From Equation 2:

$$E = K \frac{f}{dp} \quad (3)$$

and generally:

$$\text{Shore A hardness} = F(E) \quad (4)$$

More specifically, this relationship has been found to have the form:

$$\text{Shore A hardness} = F(\log E) \quad (5)$$

over a limited range.

The mechanical deformation portion of the invention is shown in FIG. 1. This apparatus is designed to measure the differential compression under major and minor loads of a moving strand of polymer, to equate this compression to a modulus, and ultimately to correlate the modulus with Shore A hardness. The two halves of the mechanical system differ only in the magnitude of the applied load so their description will be identical.

Referring now to FIG. 1, rotatably mounted in housing 20 are a first pair of shafts 22 and 24 and a second pair of shafts 26 and 28. Fixedly attached to shaft 22 is a cantilever member 30 from which is suspended a known weight 32. Weight 32 and cantilever member 30 act together on shaft 22 to cause a known clockwise torque to be placed thereon. A potentiometer (not shown) is axially mounted on shaft 22 to encode the position of shaft 22. At the end of shaft 22 opposite that which is rotatably mounted in housing 20, there is fixed a third cantilever member 36. Like cantilever member 30, cantilever member 36 extends radially outwardly from the shaft. A roller 38 is rotatably mounted on cantilever member 36 some radial distance out from shaft 22.

On shaft 24, at the end opposite that rotatably mounted in housing 20, is fixed a roller 40.

Rollers 38 and 40 cooperate together to form a first roller pair the function of which is to accurately measure the thickness of a sample for the material to be tested. For example, strands extruded from a conventional thermoplastic die have been used as the sample. Strand 10 is driven through the roller pair of rotation of the lower roller 40 by a drive means (not shown). Weight 32 and cantilever 30 act in conjunction with cantilever 36 and roller 38 to put a gentle downward force on filament 10. The force is just sufficient to maintain roller 38 in more or less constant contact with the filament 10. Variation in sizes of filament 10 are registered when the retractive force of the filament forces roller 38 further away from roller 40. The linear deflection of roller 38 with respect to roller 40 causes shaft 22 to rotate. The rotary motion of cantilever 36 and shaft 22 is detected through the potentiometer attached to shaft 22.

A second pair of rollers 60 and 62 are respectively attached to shafts 26 and 28 in the same way that rollers 38 and 40 are respectively attached to shafts 22 and 24.

In precisely the same manner as previously described, weight 64 operating at the end of cantilever member 66 acts to bring rollers 60 and 62 closer together; that is roller 60 is caused to exert a downward force. Weight 64, being substantially greater than weight 32, causes a substantially larger downward force to be exerted by roller 60. Finite compression of filament 10 occurs as it passes through roller pair 60 and 62 and is sensed through a potentiometer (not shown) axially mounted on shaft 26 in the same manner as previously described for roller pair 38 and 40. It can be seen then that roller pair 38 and 40 essentially measure the diameter of the filament whereas roller pair 60 and 62 exert a substantial force on the filament and the amount by which the filament is compressed is empirically related to hardness.

So far, the description has shown how the angular deflection of shafts 22 and 26 measure the diameter of filament 10 and the deflection of filament 10 to a given force. These measurements, having been made must now be related to Shore A hardness. As previously described, shaft 22 and shaft 26 are connected to two rotatable potentiometers (to be more fully described hereafter). The output of the potentiometers will be referred to as $d_1$ for the reference side potentiometer connected to shaft 22 and $d_2$ for the output of the measuring side potentiometer connected to shaft 26.

In attempting to arrive at Equation 4 through a determination of compression modulus (Equation 3) the analogous strain term would have to be compression deflection or compression strain, $e_c$, which would be:

$$e_c = \frac{d_1 - d_2}{d_1} \tag{6}$$

and since force is constant, the compression Modulus, M, is:

$$M = K \frac{d_1}{d_1 - d_2} \tag{7}$$

$$\text{Shore A hardness} = f \frac{Kd_1}{\frac{d_1 - d_2}{d_1}} \tag{8}$$

Equation 8 then represents an expression for Shore A hardness where the term $Kd_1$ corrects for the variation in stress produced by the application of a constant force on a sample filament which can assume a variation in thickness. The term $d_1 - d_2/d_1$ is the compressive strain resulting from the application of this stress. The expression can be related to a compressive modulus at small deformation.

Figure 2:
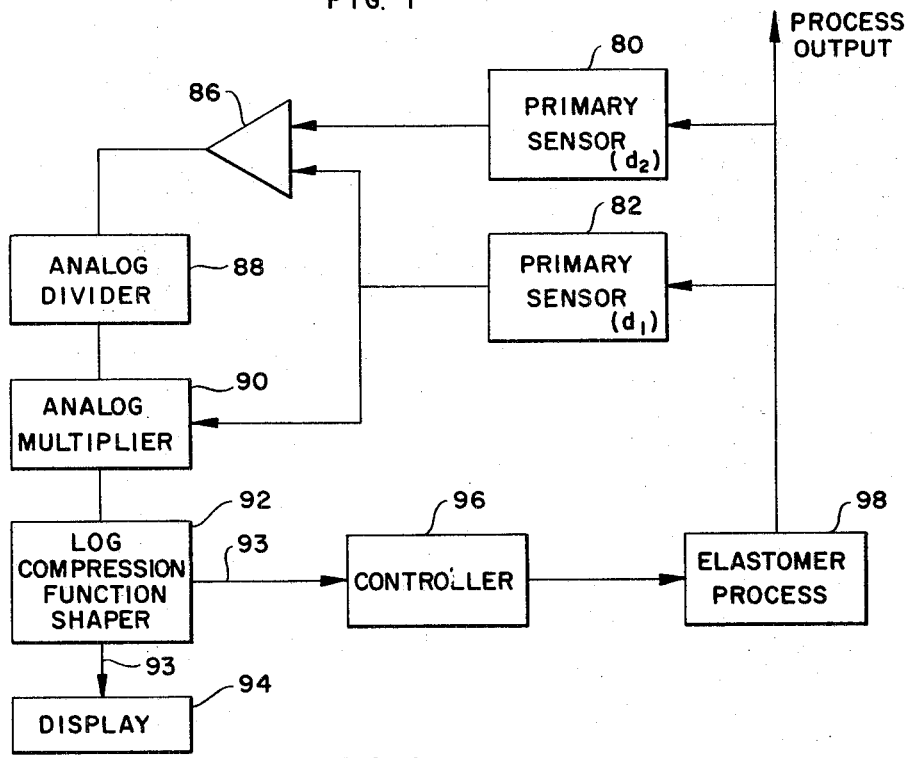
FIG. 2 is a block diagram of a preferred embodiment of the electronic section of the invention.

FIG. 2 is a block diagram of a preferred embodiment of the electronics necessary to convert the thickness measurements, $d_1$ and $d_2$ to Shore A hardness. Primary sensors 80 and 82 are potentiometers and are axially mounted on shafts 22 and 26, respectively, and convert the linear movements of the roller pairs to proportional electrical signals. An alternative hardware embodiment of the primary sensors would be the Shaevitz Rotary Differential Transformer, Model R13MLSA1, manufactured by Shaevitz's Engineering, Pennsauken, N.J. The output of primary sensors 80 and 82 are electrical signals $d_2$ and $d_1$, respectively, and are supplied to the input terminals of a differential operational amplifier 86. The output of differential operational amplifier 86 is the difference between $d_1$ and $d_2$ and is supplied to an analog divider 88. The output of analog divider 88 is supplied to one terminal of analog multiplier 90 while the other input terminal to analog multiplier 90 receives a signal from primary sensor 82. The output signal of analog divider 88 is an electrical signal equal to:

$$e_o = \frac{d_1}{d_1 - d_2} \tag{9}$$

The function of analog multiplier 90 is to multiply the output of analog divider 88 by the output of primary senor 82. The output signal of analog multiplier 90 is supplied to log compression function shaper 92 where the logarithm of the output of analog multiplier 90 is taken. Thus, the output of log compression function shaper 92 is an electrical signal 93 equal to Shore A hardness.

Electrical signal 93 would then be displayed on display 94 which may be a cathode ray oscilloscope for instance. Further, electrical signal 93 is supplied to a controller 96 which may be any one of a number of conventional electromechanical devices for converting an electrical signal into a mechanical motion. For example, controller 96 may convert electrical signal 93 into hydraulic valve settings and thereby control the rate of flow of a particular input material for the process. In FIG. 2 the polymer process is shown figuratively as box 98, and generally explained hereafter.

The operation of the functional shaper can be better understood by referring to FIG. 3. FIG. 3(a) shows the functional relationship between Shore A hardness and the log of the compression modulus $$f \frac{Kd_1}{\frac{d_1 - d_2}{d_1}}$$

By shaping the output voltage $e_o$ to the form of FIG. 3(b), that is by transforming the voltage analog of $Kd_1/d_1 - d/d_1$ to the log of that value and fitting the asymptote, the relationship shown in FIG. 3(c) can be produced.

Referring now to FIG. 4, there is shown a circuit capable of performing the functions of log compression function shaper 92. The output of analog multiplier 90 is applied through resistor 100 to the input of operational amplifier 102. The logarithmic transconductor 104 (e.g., Fairchild FA 2018, a product of Fairchild Semiconductor Division of Fairchild Camera, Corp.) is passively connected at the summation junction of operational amplifier 102. The arrangement produces a voltage at the summation junction equal to $\log_{10}$ of the input voltage.

Referring now to FIG. 4, the function is synthesized by diode 106 and its associated resistors 110, 112, 114. The diode is reverse biased so as to be non-conductive during that portion of the relationship of FIG. 3(b) where $e_o$ is a linear function of log $fKd_1/d_1 - d_2/d_1$. The diode begins to conduct at the point where the curve begins to asymptote and the diode limits the swinging in voltage at this point. The curve can be exactly synthesized by adjustment of the total current at the summation junction of operational amplifier 102 by the adjustment of series resistors 110, 112, and 114.

The method and apparatus of the present invention are useful for testing and controlling the processes of polymers in general, including elastomers such as conjugated diene polymers; thermoplastics which would include polyolefins such as polyethylene or polypropylene; and thermosetting polymers such as phenol-formaldehyde resins. It has been found to be very useful with block polymers such as polystyrene-polybutadiene-polystyrene or polystyrene-polyisoprene-polystyrene; and the like. These materials may be used without modification or may be compounded, as well-known to exerts, with fillers, plasticizers, extenders, reinforcing agents, stabilizers, curing recipe components, etc. Typical extenders and plasticizers include mineral oils and esters. Fillers may be alkaline earth metal salts such as calcium carbonate and the like; whereas typical reinforcing agents would be carbon blacks. In general, but not exclusively, the contemplated polymer content is at least 10% by weight and usually greater than 30% by weight of the composition being tested.

The process would be ultimately controlled by the input of Shore A hardness analog voltage to an analog-digital converter and to a digital process computer which would make decisions affecting the process. In addition the Shore A hardness analog voltage would be displayed on a digital meter reading directly Shore A hardness on a 0–100 scale and on an analog type recorder reading on an expanded scale with zero suppression, hardness deviation on a scale of ±5 points.

We claim as our invention:

1. An apparatus for continuously measuring the hardness of polymer material comprising:
   a housing;
   a first roller pair, each roller of said pair being mounted on parallel axis with said axis attached to said housing so as to allow relative translational motion between the axis of each roller to effectively measure the thickness of the polymer material;
   a second roller pair, said second roller pair being mounted substantially identical to said first roller pair, said second roller pair being additionally provided with a force applying means second in such a way as to encourage relative translational motion tending to bring each roller of said second roller pair together and to resist relative translational motion of the rollers in the opposite direction;
   a transducer means with the capability of receiving a mechanical input and generating electrical output for generating a first electrical signal proportional to the relative displacement of the rollers of said first roller pair, and a second electrical signal proportional to the relative displacement of the rollers of said second roller pair, the input to said transducer means being operatively coupled to said first and second roller pair;
   electronic circuitry with an input, and output, means for subtracting said first electrical signal from said second electrical signal to form a difference signal, and means for dividing the difference signal by said first electrical signal, whereby a third signal is produced, said input being electrically coupled to the output of said transducer; and
   means for producing a signal proportional to the log of said third signal, said means being connected to the output of said electronic circuitry.

2. The apparatus of claim 1 further characterized by means for limiting the level of said log signal, said means being operatively connected to said log means.

3. In a method for controlling at least one step of a process for manufacturing a polymer material wherein a sample of said material is formed thereby, the steps of:
   measuring the thickness dimension of said sample of polymer material;
   obtaining a first output signal proportional to the thickness dimension of said sample of polymer material;
   passing said sample into contact with a force applying means;
   applying a predetermined force to said sample in one dimension;
   compressing said sample under the applied force;
   obtaining a second output signal proportional to the change in said one dimension of said sample;
   subtracting the first output signal from the second output signal to form a difference signal and then dividing the difference signal by the first output signal to form a third signal;
   dividing said first signal by said third signal to form a fourth signal; and
   generating a final output signal proportional to the log of said fourth signal.

References Cited

UNITED STATES PATENTS

| 2,441,283 | 5/1948 | O'Hara | 73—78 |
| 3,195,348 | 7/1965 | Marshall | 73—78 X |
| 3,247,596 | 5/1966 | Hintermaier | 73—94 X |

RICHARD C. QUEISSER, Primary Examiner

C. E. SNEE III, Assistant Examiner